United States Patent

Schwärzler

[11] Patent Number: 5,944,612
[45] Date of Patent: Aug. 31, 1999

[54] VL JOINT FOR LONG PLUNGING DISTANCE AND LARGE ARTICULATION ANGLE

[75] Inventor: Peter Schwärzler, Glattbach, Germany

[73] Assignee: Lohr & Bromkamp GmbH, Offenbach am Main, Germany

[21] Appl. No.: 08/887,578

[22] Filed: Jul. 3, 1997

[30] Foreign Application Priority Data

Jul. 4, 1996 [DE] Germany .............. 196 26 873

[51] Int. Cl.$^6$ .................. F16D 3/223
[52] U.S. Cl. .......... 464/144; 464/145; 464/906
[58] Field of Search ................. 464/144, 145, 464/906

[56] References Cited

U.S. PATENT DOCUMENTS

| | | | |
|---|---|---|---|
| 4,678,453 | 7/1987 | Aucktor et al. | 464/906 |
| 4,909,774 | 3/1990 | Muller | 464/906 |
| 5,221,233 | 6/1993 | Jacob | 464/906 |
| 5,242,329 | 9/1993 | Jacob | 464/145 |
| 5,292,285 | 3/1994 | Ingalsbe et al. | 464/144 |
| 5,643,091 | 7/1997 | Kozlowski | 464/906 |

FOREIGN PATENT DOCUMENTS 1876790  3/1963  Germany .
3710572  8/1989  Germany .

*Primary Examiner*—Eileen Dunn Lillis
*Attorney, Agent, or Firm*—Howard & Howard

[57] ABSTRACT

A longitudinally plungeable constant velocity universal ball joint has an outer joint part (1) with inner first straight ball tracks (2), an inner joint part (7) with outer second straight ball tracks (8). Each set of associated first and second ball tracks (2, 8) accommodates one ball (10) of a plurality of torque transmitting balls (10) and with the center lines of at least part of the associated first and second ball tracks (2, 8) intersecting one another while crossing the axes ($M_i$, $M_a$) of the outer joint part (1) and inner joint part (7) respectively at opposed angles of equal size. Further, an annular cage (5) comprises a plurality of windows (6) corresponding to the plurality of balls (10), each window accommodating one of the balls (10), with the cage (5) having an outer contour which comprises a central spherical surface portion centering the cage (5) relative to the outer joint part (1) when the joint is in the aligned position, and adjoining conical faces half the opening angle of which corresponds to half the maximum articulation angle $\beta/2$, with the conical faces (32, 33, 42, 43) being positioned inwardly by a distance $\Delta$ relative to conical reference faces (12, 13) which tangentially adjoin a central reference face (11) in the form of a segment of a sphere and half the opening angle of which corresponds to half the maximum articulation angle $\beta/2$.

4 Claims, 6 Drawing Sheets

VL JOINT FOR LONG PLUNGING DISTANCE AND LARGE ARTICULATION ANGLE

BACKGROUND OF THE INVENTION

The invention relates to a longitudinally plungeable constant velocity universal ball joint having an outer joint part with inner first straight ball tracks, an inner joint part with outer second straight ball tracks, with each set of associated first and second ball tracks accommodating one ball of a plurality of torque transmitting balls and with the center lines of at least part of the associated first and second ball tracks intersecting one another while crossing the axes of the outer joint part and inner joint part respectively at opposed angles of equal size, and further having an annular cage which comprises a plurality of windows corresponding to the plurality of balls, each window accommodating one of the balls, with the cage having an outer contour which comprises a central spherical surface portion centering the cage relative to the outer joint part when the joint is in the aligned position, and adjoining conical faces half the opening angle of which corresponds to half the maximum articulation angle $\beta/2$.

Joints of this type are used in drivelines of motor vehicles to achieve long plunging distances, for example in driving halfshafts at the inner end of the differential. They are described in DE-GM 1 876 790 for example.

In a developed view, the intersecting tracks may extend parallel relative to one another in the inner joint part and outer joint part or they may form opposed angles of equal size with the axial direction.

Joints of this type must be produced with tracks intersecting one another in accordance with the definition. However, it is also possible to provide axis-parallel tracks which complement the intersecting tracks serving to control the balls on to half the plunging distance and on to the angle-bisecting plane and thus to control the cage in the case of plunging movements and articulation movements.

The inner contour of the outer joint part which serves for axially guiding the cage is entirely cylindrical and does not permit any other design possibilities. The shape of the cage and the outer contour of the inner joint part does permit different designs, with certain design objectives not being compatible with one another. For strength reasons it is desirable for the wall thickness of the cage to be as great as possible. On the other hand, to increase the torque capacity attempts have to be made to provide the tracks in the inner joint part with as much depth as possible. These two requirements, when put into practice, restrict one another. Furthermore, it is desirable on the one hand to provide joints with as large an articulation angle as possible while at the same time aiming at a long plunging distance. However, as in a fully extended and articulated joint the points of intersection on the axes of the respective components are no longer located in the component center, the maximum possible articulation angle is reduced when extending the joint.

A further design criterion refers to the contact of the ball in the cage window. Care has to be taken to ensure that the point of contact is not too close to the inner edge of the cage to prevent material from breaking off, especially after the occurrence of slight wear.

There are already prior art joints of the initially mentioned type wherein the outer contour of the cage consists of a central spherical disc and adjoining conical portions. In a longitudinal section, the outer contour can be described as being "roof-like". Half the opening angle of the cone corresponds to half the articulation angle of the joint, which is due to the fact that relative to each of the two joint components, i.e. the outer joint part and inner joint part, the cage carries out only half the articulation angle.

Furthermore, it is the case with such prior art joints that the outer contour of the inner joint part also comprises two conical portions which, as a rule, are connected to one another by a simple turned central cylindrical portion. Under conditions of maximum joint articulation, the conical portions of the cage cooperate with the cylindrical inner face of the outer joint part and the conical portions of the inner joint part cooperate with the cylindrical inner face of the ball cage in that they limit the articulation angle and the plunging distance by contacting one another.

It is the object of the present invention to improve a joint of the above-mentioned type without substantially reducing its strength in that at a given maximum articulation angle, the axial plunging distance can be improved and that, with an unchanged articulation angle and axial plunging distance, the torque transmitting capacity of the inner joint part can be increased.

SUMMARY OF THE INVENTION

The objective is achieved in that relative to conical reference faces which tangentially adjoin a central reference face in the form of a segment of a sphere and half the opening angle of which corresponds to half the maximum articulation angle $\beta/2$, the conical faces are positioned inwardly by a distance $\Delta$.

In a first embodiment, the central spherical face is formed by a barrel face whose centers $M_1$, $M_2$ of its radii of curvature $R_1$, $R_2$ are positioned so as to be substantially offset away from the central axis $M_k$ of the cage towards the surface.

A second embodiment is characterized in that the central spherical face constitutes a face of a segment of a sphere half the center angle $\beta_o/2$ of which is smaller than half the maximum articulation angle $\beta/2$.

BRIEF DESCRIPTION OF THE DRAWINGS

To explain the features and functioning of the invention, the drawings will be described directly, and in this context, reference is made to the remaining subclaims.

DETAILED DESCRIPTION OF THE DRAWINGS

Figure 1:
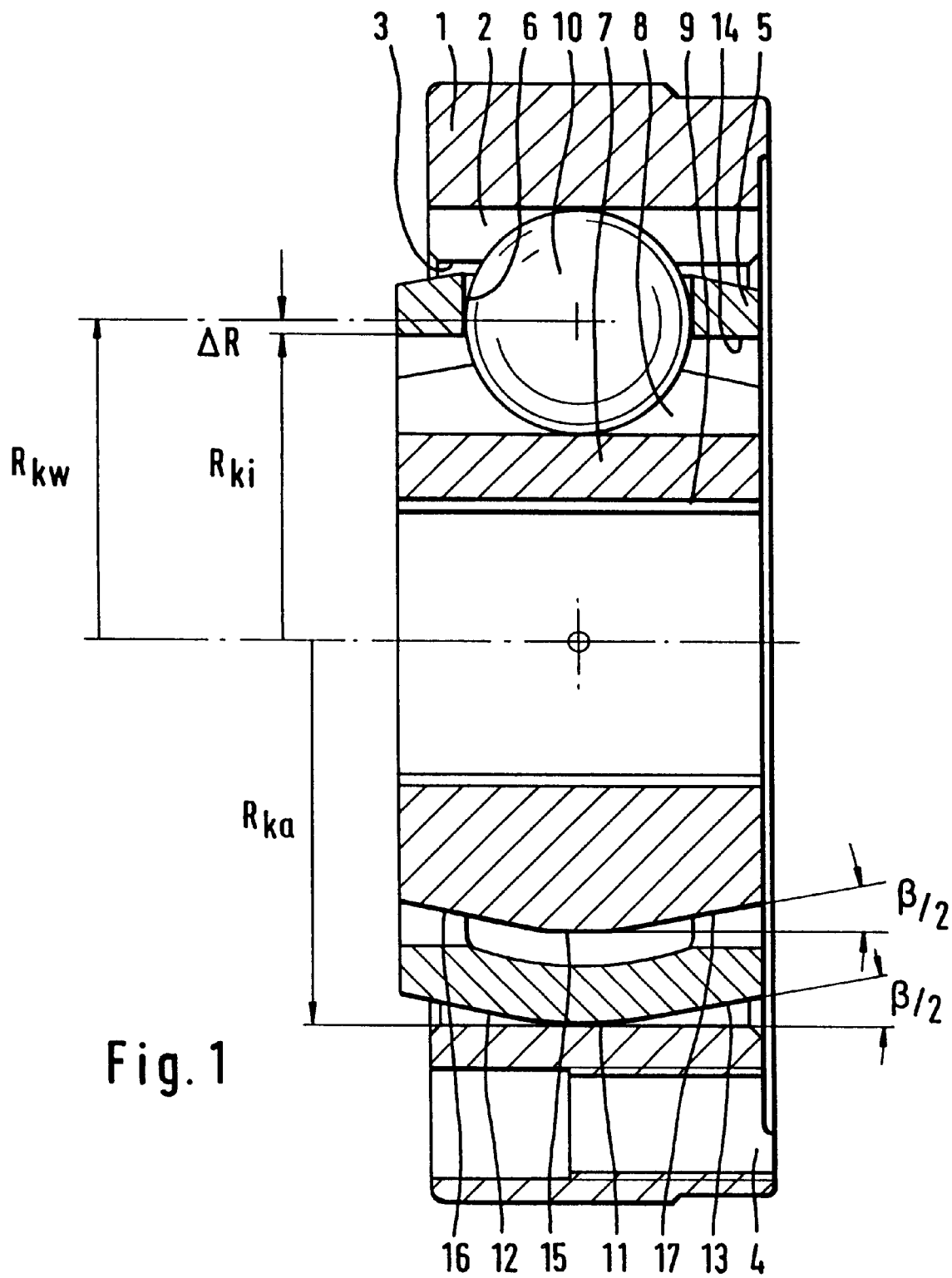
FIG. 1. is a longitudinal section of a joint in accordance with the state of the art, in an aligned condition.

FIG. 1 is a longitudinal section of a joint in accordance with the state of the art, showing an outer joint part 1 with first straight inner tracks 2 and an inner cylindrical guiding face 3. At the lower end of the section, the outer joint part 1 is provided with a threaded bore 4 by means of which the outer joint part can be bolted to a drive part. The internally cylindrical guiding face 3 accommodates a cage 5 which is provided with a number of circumferentially distributed cage windows 6. Inside the outer joint part 1 and the cage 5, there is positioned an inner joint part 7 with second outer straight ball tracks 8. The inner joint part 7 is provided with a toothed inner recess 9 formed for inserting a driveshaft. One torque transmitting ball 10 is held in first and second ball tracks 2, 8 associated with one another in pairs, and accommodated by one of the cage windows 6 of the cage 5. The track 2 and 8 are shown as straight, axis-parallel ball tracks although, in actual fact, in a developed view relative to the longitudinal direction of the respective joint component, they comprise an angle of inclination, i.e. they are skew relative to the respective longitudinal axes while intersecting one another. The cage 5 has an outer contour which is composed of a spherical central portion 11 with the radius $R_{ka}$ and two tangentially adjoining conical portions 12, 13. Furthermore, the cage 5 comprises a cylindrical inner aperture 14. The inner joint part 7 has an outer contour with a central turned cylindrical portion 15 as well as adjoining conical portions 16, 17. Half the opening angle of the cones 12, 13 and 16, 17 is marked as half the joint articulation angle $\beta/2$. It can be seen that an increase in the angle $\beta/2$ would lead to a reduction in the track depth of the second ball tracks 8 in the inner joint part 7. The inner diameter of the ball cage 5 is such that the rolling circle radius $R_{kw}$ of the balls is greater than the radius $R_{ki}$ of the inner cylindrical face 14 of the cage ($\Delta R = R_{kw-Rki} > 0$). The difference indicates the distance of the contact points of the ball in the cage from the inner edges of the cage windows. If this value is too small, material may break off from the inner edges of the cage windows.

Figure 2:
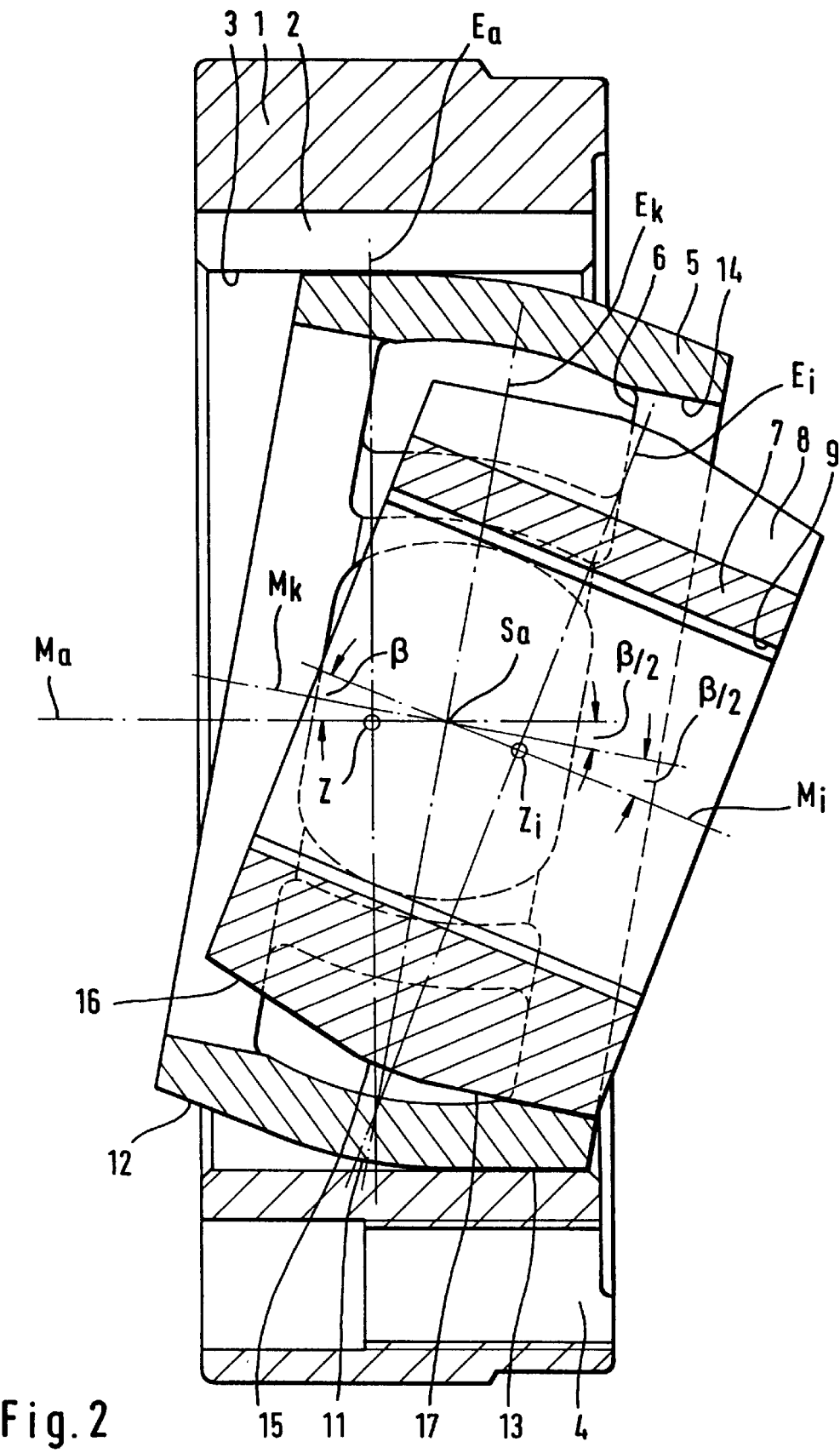
FIG. 2 shows a joint according to FIG. 1 articulated and extended to its maximum value.

The joint which is illustrated in FIG. 2 and is in an axially extended and articulated position is similar to that shown in FIG. 1. Identical details have been given identical reference numbers. The center line $M_i$ of the inner joint part 7 is pivoted relative to the center line $M_a$ of the outer joint part 1 by the joint articulation angle $\beta$, whereas the center line $M_k$ of the cage 5 is pivoted relative to both by half the articulation angle $\beta/2$ in each case. At the same time, the actual point of intersection $S_a$ is displaced relative to the original joint center Z in the central plane $E_a$ of the outer joint part 1 and relative to the center $Z_i$ of the inner joint part 7 in the central plane $E_i$ of the inner joint part 7 on their axes $M_i$, $M_a$, with the cage 5, by means of its conical faces 12 and 13, being in line contact with the cylindrical inner face 3 of the outer joint part 1. The inner joint part 7, by means of its conical face 17, contacts the cylindrical inner aperture 14 of the cage 5. In this illustration it becomes clear that the maximum articulation angle $\beta$ in the maximum extended position is limited by the outer shape of the cage and that the inner joint part, in respect of its outer shape, is adapted to the maximum articulation angle $\beta$ in the sense of having the greatest possible track depth, so that there takes place simultaneous contact between the cage 5 and the outer joint part 1 on the one hand and the inner joint part 7 and the cage on the other hand. The maximum extended position is determined by the outermost position of the ball in the ball track 2 of the outer joint 1 part in the articulation plane delimited by the center lines $M_i$, $M_a$.

Figure 3:
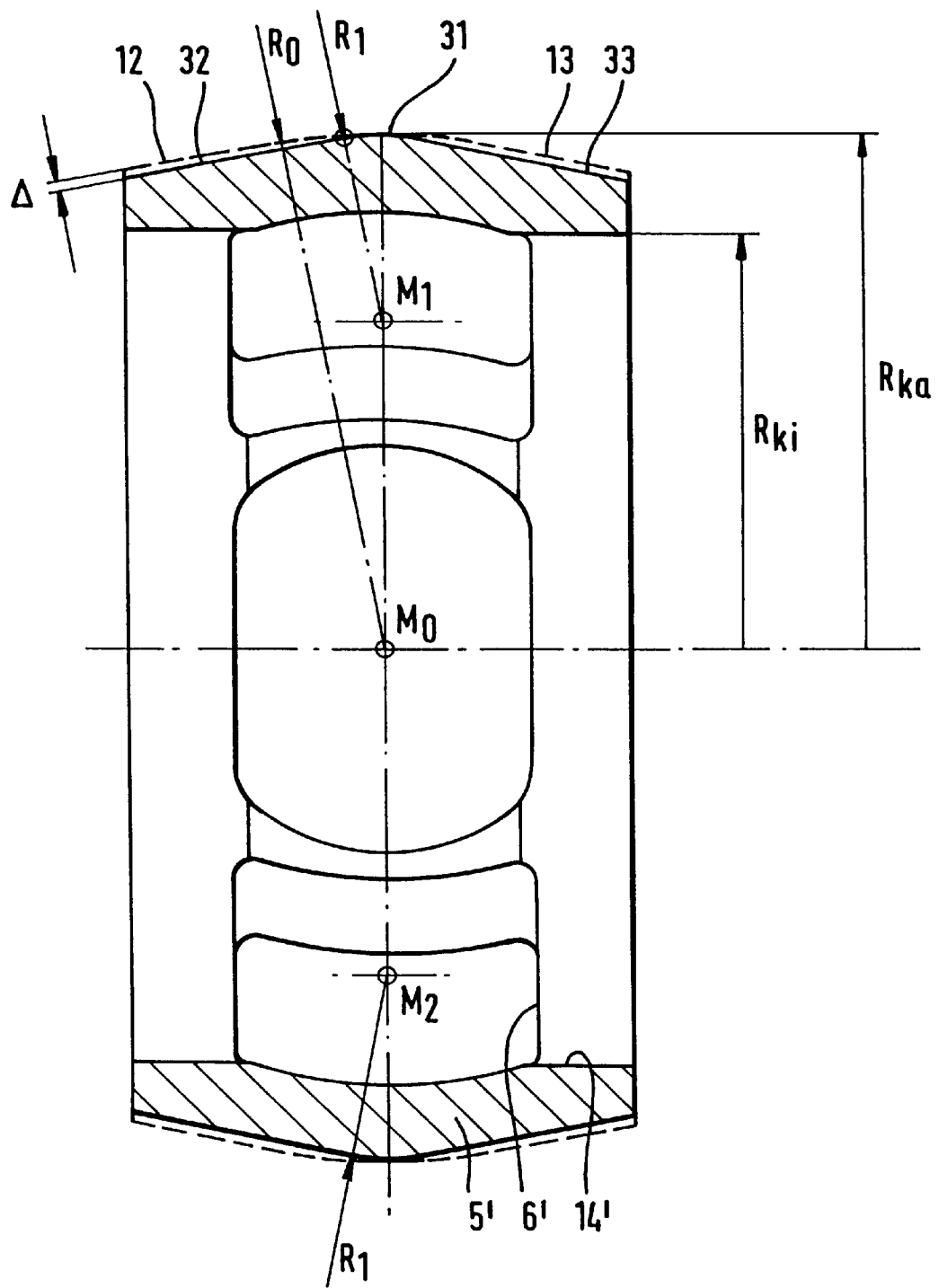
FIG. 3 shows a cage for a first embodiment of an inventive joint which, with the exception of the cage, can be identical to the joint according to FIGS. 1 and 2.

FIG. 3, in dashed lines, shows a cage in the embodiment according to FIGS. 1 and 2 and in continuous lines it shows a cage in accordance with the invention. The radius $R_k$ of the cylindrical inner aperture 14 of the cage 52 is unchanged. The outer contour of the cage according to the state of the art is composed of a central spherical portion 11 with the radius $R_o$ around the center $M_o$ and of the tangentially adjoining conical faces 12, 13. The opening angle of the spherical portion, in each case with reference to the central plane, corresponds on both sides to half the articulation angle $\beta/2$. On the other hand, the inventive ball cage comprises an outer contour with a central barrel-shaped portion 31 with a radius of curvature $R_1=R_2$ around the centers $M_1$, $M_2$ as well as conical faces 32, 33 which, in parallel, are positioned inwardly by the amount $\Delta$ relative to the conical faces 12, 13. The greatest central outer radius of the cage is unchanged at $R_{ka}=R_o$.

Figure 4:
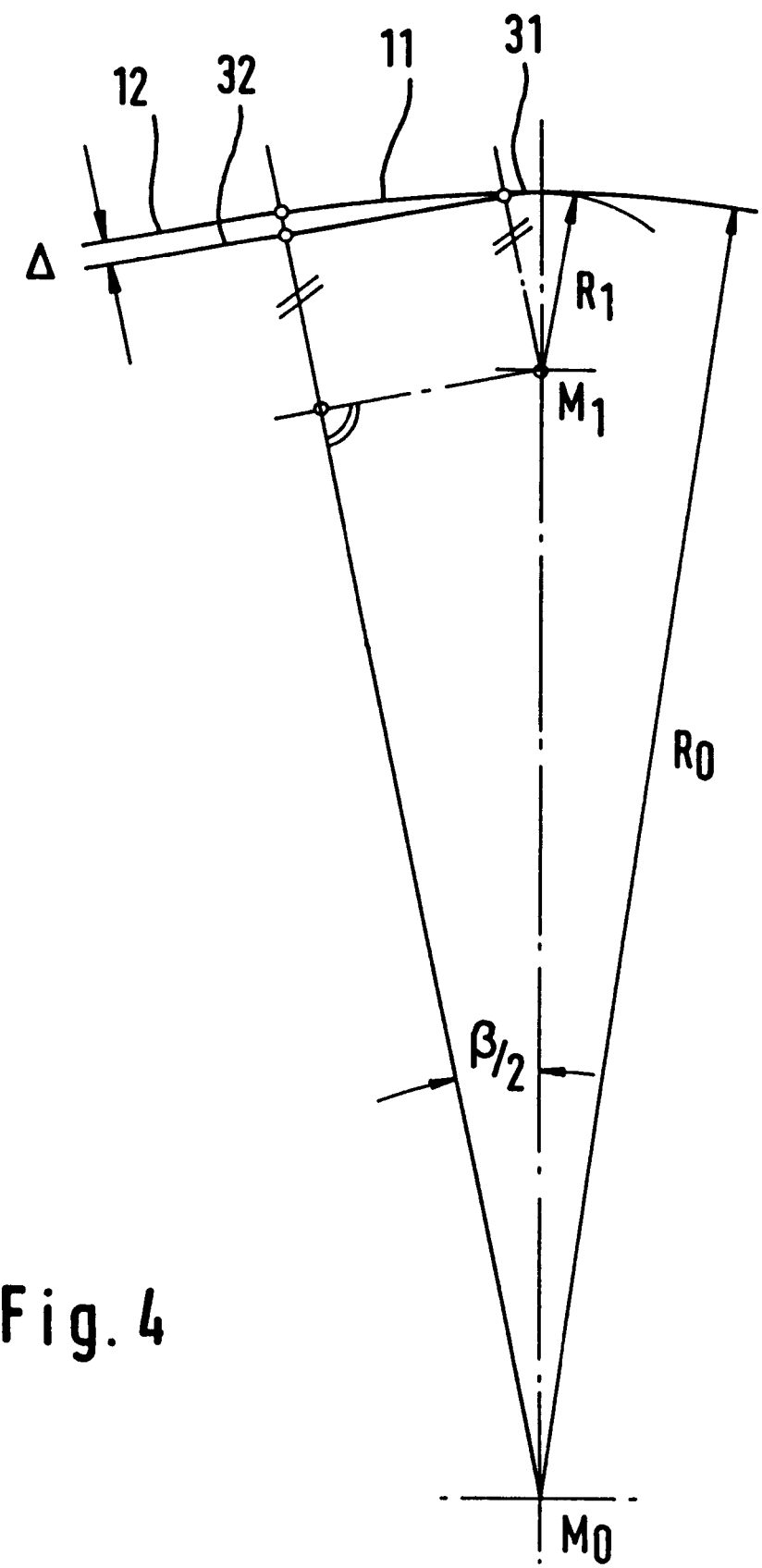
FIG. 4 shows the outer contour of the cage according to FIG. 3 in an enlarged scale.

In FIG. 4, the corresponding outer contours and their generatrices are again shown in a larger scale in the upper half of the Figure, with the same reference numbers being used. The amount $\Delta$ has been calculated as being $(R_o-R_i)(1-\cos \beta/2)$.

Figure 5:
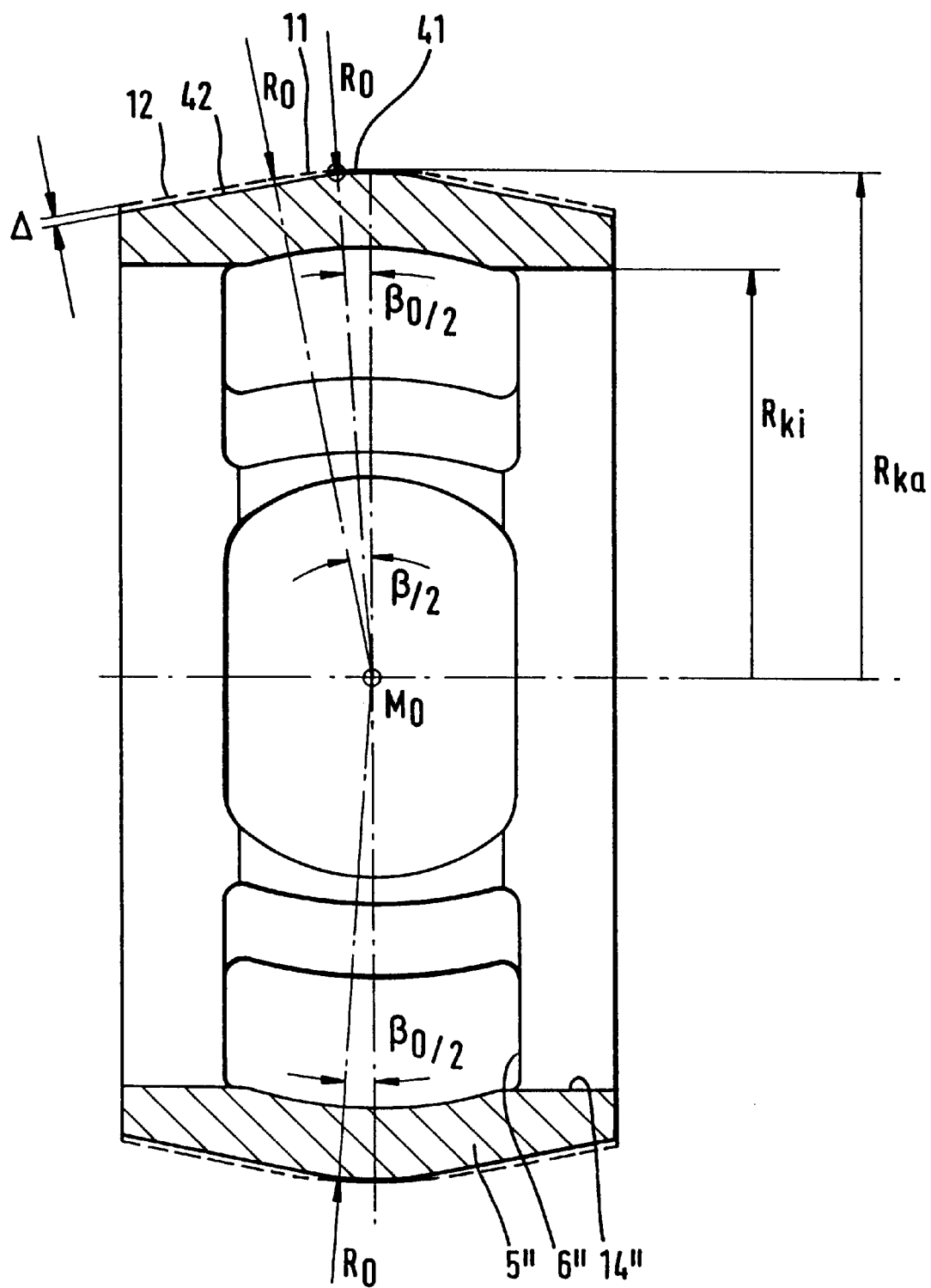
FIG. 5 shows a cage for a second embodiment of an inventive joint which, with the exception of the cage, can be identical to the joint according to FIGS. 1 and 2.

FIG. 5, in dashed lines, shows a cage in the embodiment according to FIGS. 1 and 2 and, in continuous lines, a cage in accordance with the invention. The radius $R_{ki}$ of the cylindrical inner aperture 14 of the cage is unchanged. The outer contour of the cage 5 according to the state of the art is composed of a central spherical portion 11 with the radius $R_o$ around the center $M_o$ and of tangentially adjoining conical faces 12, 13. On the other hand, the inventive ball cage comprises an outer contour with a central spherical portion with the same radius $R_o$ around the center $M_o$, but a smaller respective opening angle $\beta_o/2$ on both sides of the central plane, as well as conical faces 42, 43 which, in parallel, are displaced inwardly by the amount $\Delta$ relative to the conical faces 12, 13. The greatest central outer radius of the cage is unchanged at $R_{ka}=R_o$.

Figure 6:
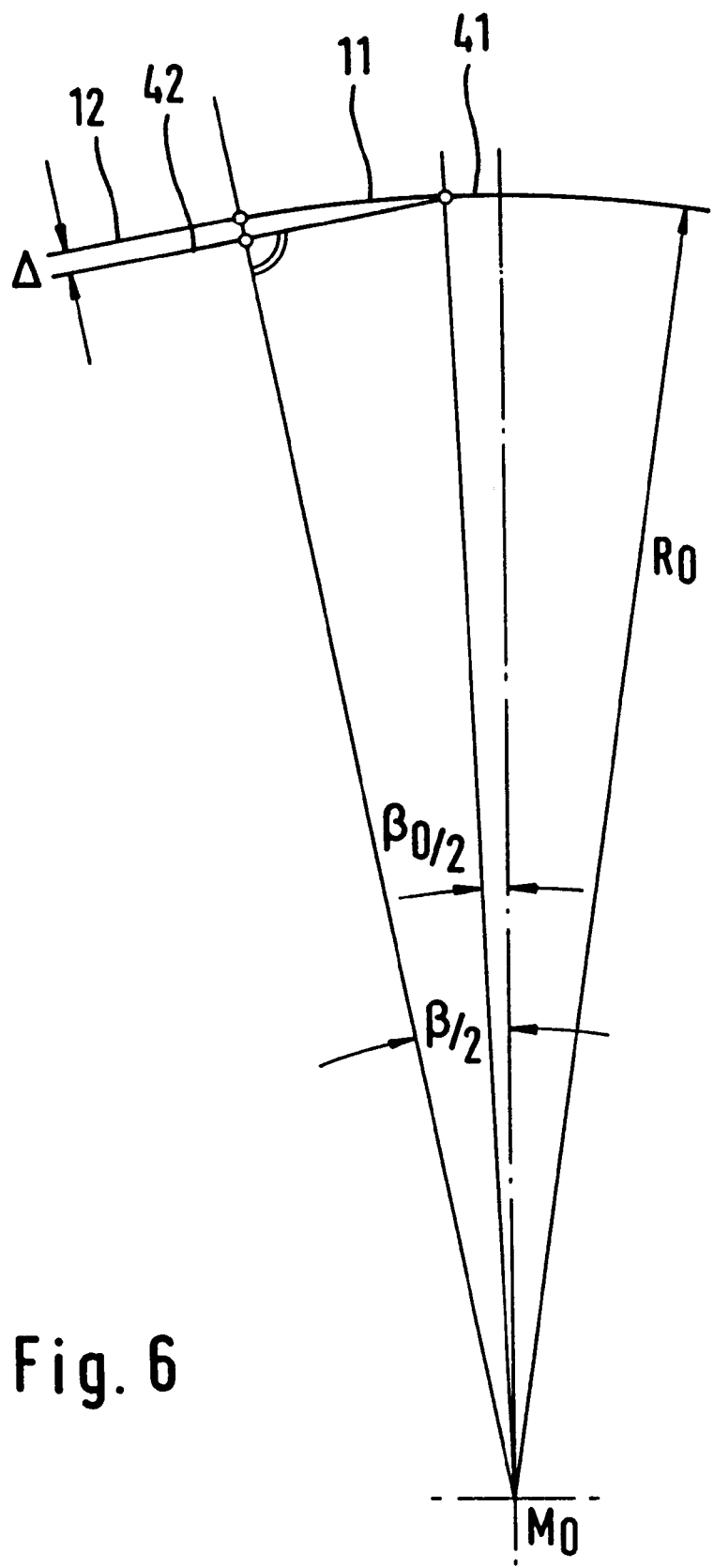
FIG. 6 Shows the outer contour of the cage according to FIG. 5 in an enlarged scale.

In FIG. 6, the corresponding outer contours and their generatrices are again shown in a larger scale in the upper half of the Figure, with the same reference numbers being used. The amount of $\Delta$ has been calculated to be approximately $\frac{1}{8} R_o (\beta-\beta_o)^2$.

The illustrations in FIGS. 3 and 5 show that, when the joint is in the aligned position, the cage is held in the same way in the inner face 3 of the outer joint part 1 as conventional ball cages.

However, when the joint is articulated and extended to its maximum values as shown in FIG. 2, the inventive cages can be radially displaced by the amount $\Delta$ in the articulation plane towards the diagonal end, so that a gap of approximately uniform thickness could occur between the conical face 17 of the inner joint part 7 and the cylindrical inner face 14 of the cage 5. With a predetermined articulation angle determined by the contact of the cage at the outer joint part, such a gap provides a first possibility of axially extending the joint until the gap has become 0. A second possibility of radially displacing the cage by the amount $\Delta$ consists in providing the inner joint part with a shape increased by said thickness, so that, in spite of the fact that the cage is radially displaced by the amount $\Delta$, no gap can occur between the cylindrical inner recess 14 of the cage 5 and the conical face 17 of the inner joint part 7, but instead generate contact in said region by changing the design of the inner joint part. This means that the conical faces 16, 17 are displaced outwardly approximately by the amount $\Delta$, so that the track depth of the tracks 8 in the inner joint part 7 is increased accordingly at the track ends, as a result of which the torque transmitting capacity of the inner joint part and thus of the joint as a whole under maximum articulation conditions is increased.

Preferred embodiments have been disclosed. However, the following claims should be studied to determine the true scope and content of this invention.

I claim:

1. A longitudinally plungeable constant velocity universal ball joint having an outer joint part with inner first straight ball tracks, an inner joint part with outer second straight ball tracks, with each set of associated first and second ball tracks accommodating one ball of a plurality of torque transmitting balls and with the center lines of at least part of the associated first and second ball tracks intersecting one another while crossing the axes ($M_i$, $M_a$) of the outer joint part and inner joint part respectively at opposed angles of equal size, and further having an annular cage which comprises a plurality of windows corresponding to the plurality of balls, each window accommodating one of the balls, said constant velocity universal ball joint enabling articulation of said outer joint part versus said inner joint part, a maximum of said articulation being defined by a maximum articulation angle ($\beta$), with the cage having an outer contour which outer contour comprises a central spherical surface portion and conical faces adjoining said central spherical surface portion, said central spherical surface portion centering the cage relative to the outer joint part when the joint is in the aligned position, and said conical faces being defined by a first opening angle, with said first opening angle corresponding to half the size ($\beta/2$) of said maximum articulation angle ($\beta$), wherein the conical faces are positioned inwardly by a distance ($\Delta$) relative to conical reference faces which tangentially adjoin a central reference face, with said conical reference faces being defined by a second opening angle and with said central reference face having the form of a segment of a sphere and wherein half the size of said second opening angle corresponds to half the size ($\beta/2$) of the maximum articulation angle ($\beta$) with the central spherical surface portion and the central reference face coinciding in the center plane of the cage, and with the cage being radially displaceable by the amount ($\Delta$) at maximum joint articulation.

2. A joint according to claim 1, wherein the central spherical face is formed by a barrel face, said barrel face being generated by rotation of a circular curvature about a central axis ($M_k$) in that centers ($M_1$, $M_2$) of radii of said curvature ($R_1$, $R_2$) of said barrel face are positioned so as to be substantially offset away from the central axis ($M_k$) of the cage toward the surface.

3. A joint according to claim 1, wherein
   the central spherical face constitutes a face of a segment of a sphere half the center angle ($\beta_o/2$) of which is smaller than half the maximum articulation angle ($\beta/2$) of the joint.

4. A joint according to claim 1, wherein
   when the articulation angle and plunging distance of the joint have each reached their respective maximum value the radially displaced cage simultaneously rests with the conical faces of its outer contour against the cylindrical inner aperture of the outer joint part and with a cylindrical inner aperture against outer faces of the inner joint part.

* * * * *